Patented June 15, 1937

2,083,890

UNITED STATES PATENT OFFICE 2,083,890

DIAMINO COMPOUNDS AND PROCESS OF MAKING SAME

Werner Zerweck and Ernst Korten, Frankfort-on-the-Main-Fechenheim, Germany, assignors to General Aniline Works, Inc., New York, N. Y., a corporation of Delaware No Drawing. Application December 31, 1935, Serial No. 57,006. In Germany December 8, 1934.

5 Claims. (Cl. 260—130.5)

Our present invention relates to new condensation products and process of making same more particularly to those of the general formula:

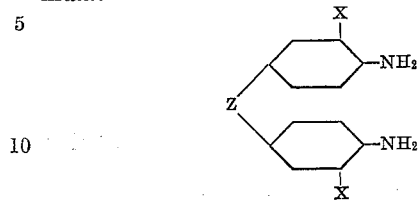

wherein Z stands for an aromatic at least trinuclear radical containing one of the carbon skeletons:

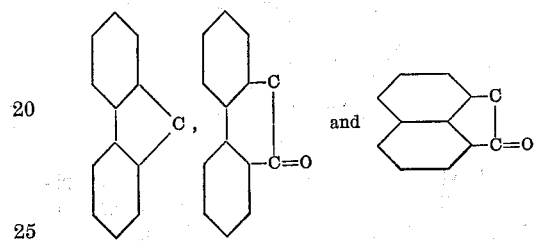

and X stands for one of the group consisting of hydrogen, methyl and methoxy.

The new condensation products are obtained by condensing aromatic ketocompounds of the general formula Z=O, wherein Z has the aforesaid signification, with primary aromatic amines of the benzene series having a free para-position of the general formula:

wherein X has the aforesaid signification, in the presence of mineral acids.

The new condensation products are soluble in acids and contain free diazotizable amino groups. They are therefore capable of various further reactions and are valuable intermediates for the production of dyestuffs and pharmaceutical products.

The course of reaction could not be foreseen since the formation of azomethines was to be expected in accordance with the analogous formation of azines by condensing ortho-diketones with ortho-diamines as described in the literature.

In order to further illustrate our invention the following examples are given, the parts being by weight and all temperatures in centigrade degrees. We wish it however to be understood that our invention is not limited to the particular products nor reaction conditions mentioned therein.

Example 1

90 parts of fluorenone are mixed with 163 parts of aniline and about 150 parts of dilute sulfuric acid and the mixture is heated for some hours at 140° to 150° C. in a closed vessel. Then the reaction mass is made alkaline by adding sodium carbonate and the excess of aniline is expelled by steam distillation.

The residue is dissolved in dilute hydrochloric acid and the free base is precipitated by adding an alkali to the solution of the hydrochloride. A diamine containing two primary amino groups is obtained with a good yield, said diamine crystallizing from xylene as fine colorless needles with a melting point of 233° C. The hydrochloride crystallizes as snow white leaflets relatively difficultly soluble in dilute hydrochloric acid.

The reaction runs according to the following scheme:

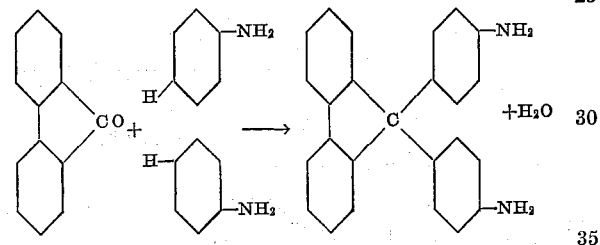

When decomposing 2-nitrofluorenone with aniline the formed condensation product is obtained as greenish yellow leaflets of 254° C. melting point.

The condensation product of 2-amino-fluorenone with ortho-toluidine is a triamine. It is a light grey powder, crystallizing from monochlorobenzene and decomposing above 220° C.

When heating a mixture of fluorenone-2-sulfonic acid and ortho-anisidine in the presence of phosphoric acid, the formed condensation product is a light green powder easily soluble in dilute alkalies and acids and diazotizable.

When starting from benzo-fluorenone similar products are obtained.

Example 2

A mixture of 90 parts of acenaphthenequinone, 172 parts of aniline and about 150 parts of dilute hydrochloric acid is heated in a closed vessel for some hours at 140 to 150° C. The reaction mass is made alkaline to a feeble alkaline reaction and the excess of aniline is expelled by steam distillation. A solid residue is obtained which is entirely soluble in dilute acids. The solution thus obtained may be purified by removing some impurities by filtration and the new base is precipitated as a slightly brownish compound by adding an alkali to the solution. The new base is diazotizable, soluble in acetone and dioxane, and rather difficultly soluble in xylene, from which it crystallizes. Its melting point is at 200 to 202° C. The course of reaction may be illustrated by the following scheme:

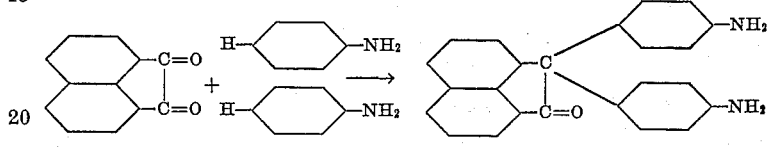

When using instead of hydrochloric acid the equivalent amount of dilute phosphoric acid and heating the mixture for about 30 hours to boiling in an apparatus provided with a reflux condenser the same condensation product is obtained.

*Example 3*

45 parts of acenaphthenequinone and 107 parts of orthoanisidine are heated in the presence of about 70 parts of dilute hydrochloric acid as described in the foregoing example. The new base of the formula:

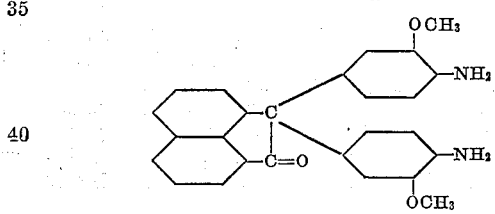

is, when dry, a brown powder which is diazotizable and easily soluble in dilute acids.

*Example 4*

A mixture of 52 parts of phenanthrenequinone, 82 parts of aniline and about 70 parts of dilute sulfuric acid is heated in a closed vessel for some hours at about 150° C. The new base thus obtained of the formula:

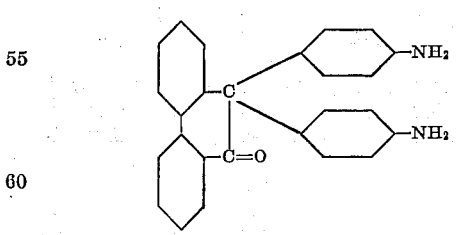

is, when dry, a light grey powder, which is diazotizable and easily soluble in dilute acids.

Analogous condensation products are obtained by condensing chrysene quinone, fluoranthenequinone, aceanthrenequinone or their substitution products with aniline and its homologues and substitution products having a free para-position.

We claim:

1. A process for producing diamino compounds which comprises heating at temperatures of about 140 to about 150° C. a mixture of a non-oxidizing mineral acid, one molecular proportion of an aromatic keto compound of the formula Z=O, wherein Z stands for an aromatic, at least trinuclear radical containing a member of the group consisting of the carbon skeletons:

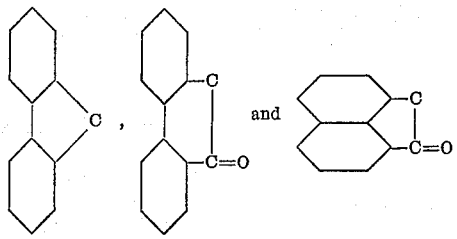

and two molecular proportions of an aromatic amine of the formula:

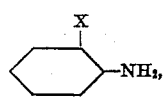

wherein X stands for one of the group consisting of hydrogen, methyl and methoxy.

2. Diamino compounds of the general formula:

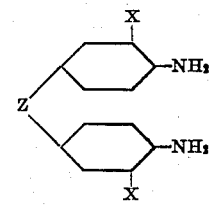

wherein Z stands for an aromatic, at least trinuclear radical containing a member of the group consisting of the carbon skeletons:

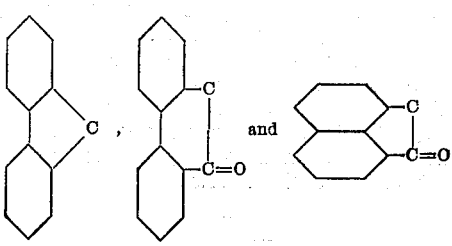

and X stands for one of the group consisting of hydrogen, methyl and methoxy, which basic condensation products are soluble in acids and contain diazotizable amino groups.

3. The diaminocompound of the formula:

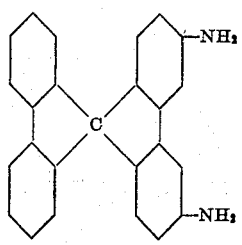

which basic product contains two primary amino groups and crystallizes from xylene as colorless needles of 233° C. melting point, the hydrochloride of which crystallizes as snow white leaflets.

4. The diaminocompound of the formula:

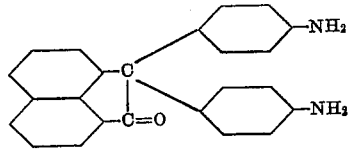

which basic product is a slightly brown powder, diazotizable and soluble in acetone and dioxane, less soluble in acetone, from which it crystallizes, and melts at 200 to 202° C.

5. The diaminocompound of the formula:

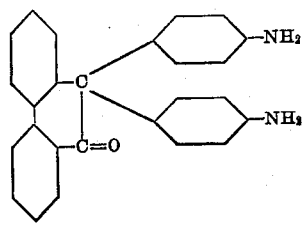

which basic product is, when dry, a light grey powder, diazotizable and easily soluble in dilute acids.

WERNER ZERWECK.
ERNST KORTEN.